Sept. 3, 1957     J. W. FAULHABER ET AL     2,804,756
PACKAGE UNIT VEHICLE AIR CONDITIONING APPARATUS
Filed Dec. 29, 1953     9 Sheets-Sheet 1

INVENTORS
James W. Faulhaber
Ferd W. Fisher
BY Homer C. Simons
Thomas W. Murray
Williams, David & Hoffmann
Attorneys Sept. 3, 1957

J. W. FAULHABER ET AL 2,804,756

PACKAGE UNIT VEHICLE AIR CONDITIONING APPARATUS

Filed Dec. 29, 1953

INVENTORS
James W. Faulhaber
Ferd W. Fisher
Homer C. Simons
Thomas W. Murray

BY Hudson, Doughton,
Williams, David & Hoffmann
Attorneys

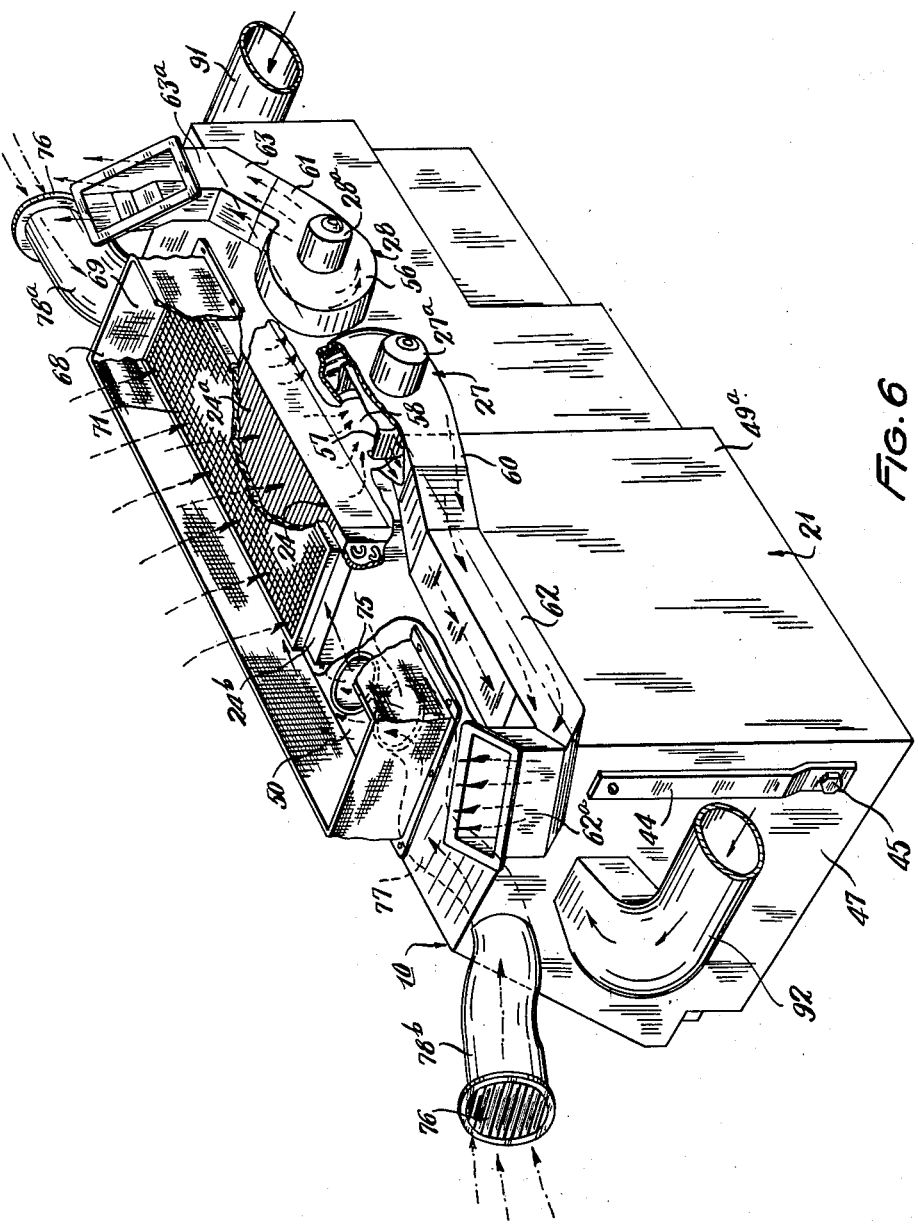

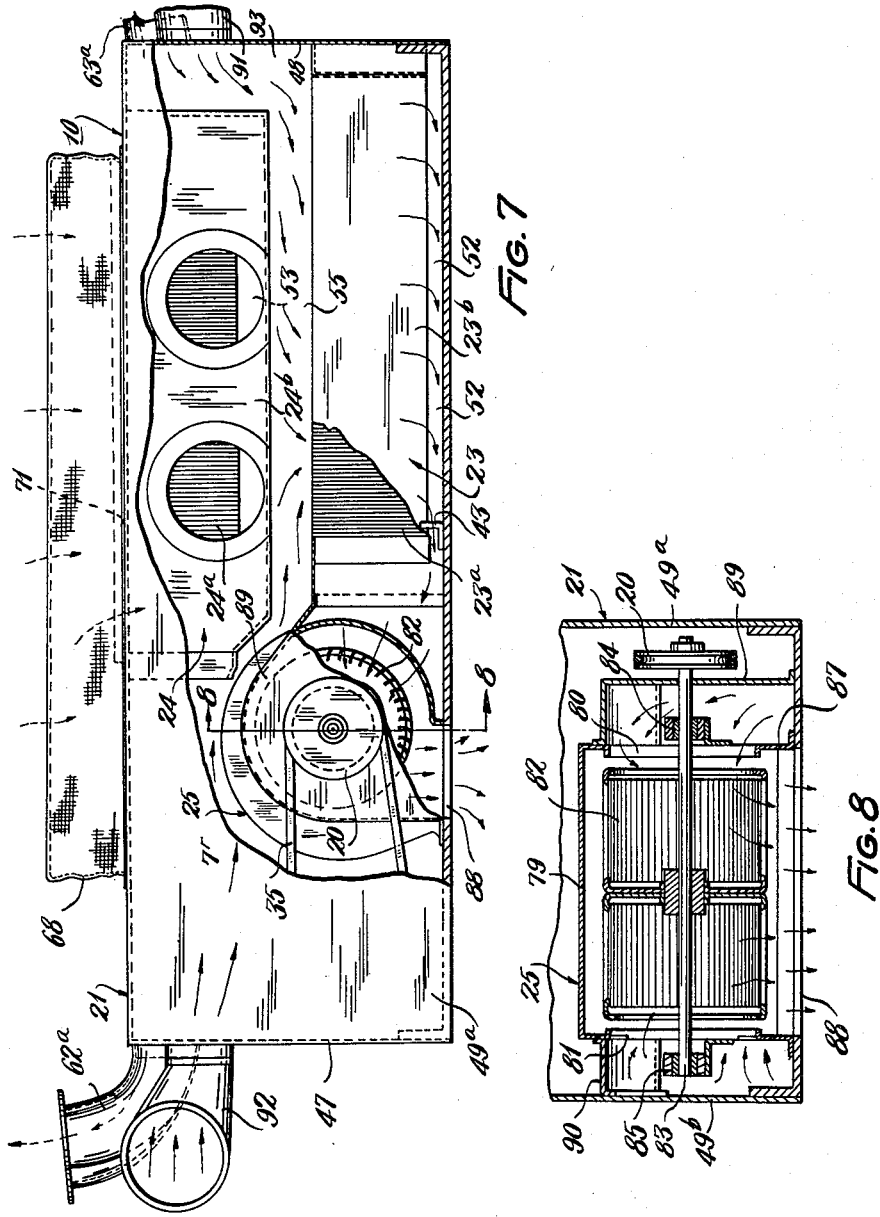

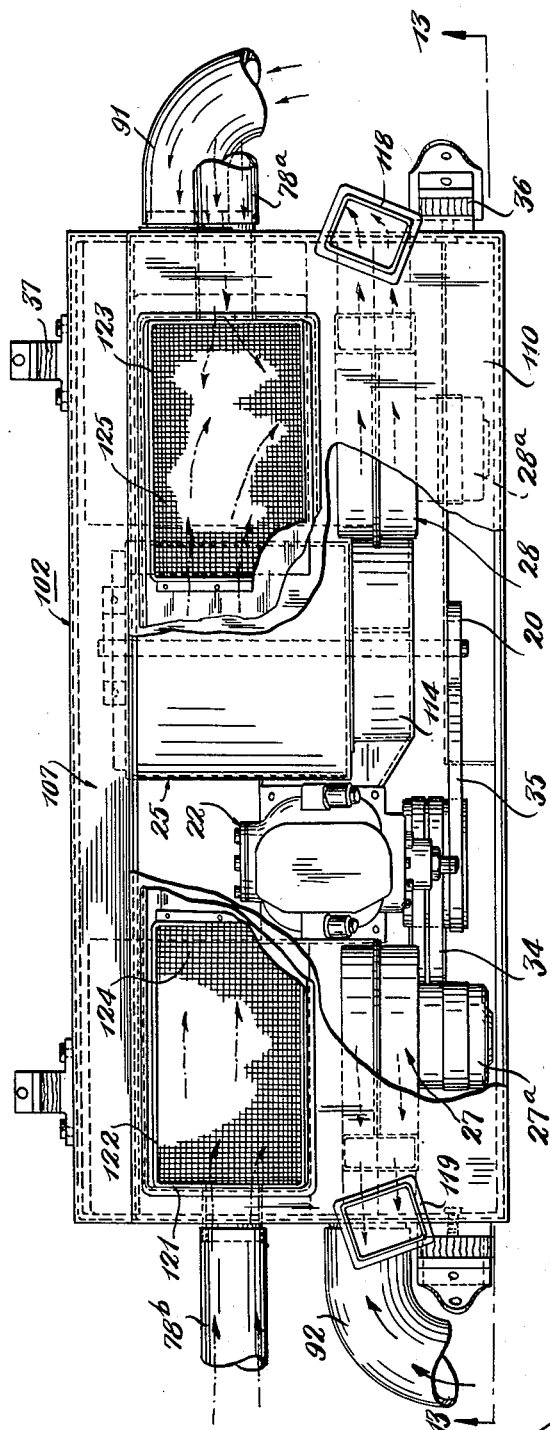

Sept. 3, 1957  J. W. FAULHABER ET AL  2,804,756
PACKAGE UNIT VEHICLE AIR CONDITIONING APPARATUS
Filed Dec. 29, 1953  9 Sheets-Sheet 8

INVENTORS
James W. Faulhaber
Ferd W. Fisher
BY Homer C. Simons
Thomas W. Murray
Hudson, Boughton,
Williams, David & Hoffmann
Attorneys Sept. 3, 1957 J. W. FAULHABER ET AL 2,804,756
PACKAGE UNIT VEHICLE AIR CONDITIONING APPARATUS
Filed Dec. 29, 1953 9 Sheets-Sheet 9

INVENTORS
James W. Faulhaber
Ferd W. Fisher
BY Homer C. Simons
Thomas W. Murray
Hudson Boughton
Williams, David & Hoffmann
Attorneys United States Patent Office 2,804,756
Patented Sept. 3, 1957

2,804,756
PACKAGE UNIT VEHICLE AIR CONDITIONING APPARATUS

James W. Faulhaber, Cleveland, Ferd W. Fisher, Bedford, Homer C. Simons, South Euclid, and Thomas W. Murray, Cleveland, Ohio, assignors to Eaton Manufacturing Company, Cleveland, Ohio, a corporation of Ohio Application December 29, 1953, Serial No. 401,016

6 Claims. (Cl. 62—117.1)

This invention relates to vehicle air conditioning, that is, the cooling and ventilating of motor vehicles by air flow, and particularly, by the use of air conditioning apparatus in the form of a prefabricated package unit embodying refrigeration means for cooling the air with which the ventilating and conditioning is accomplished.

The space available in present-day automobiles and other motor vehicles for accommodating such cooled-air type of conditioning apparatus (hereinafter referred to as air conditioning apparatus or merely as conditioning apparatus) is usually too limited and inaccessible for installation of such apparatus in the form of individual components. Moreover, it is essential that the cost of the conditioning apparatus be kept to a minimum and that the apparatus be inherently quiet in operation, both with respect to its moving parts and with respect to the transfer of vibrations to adjacent vehicle structure. It is also important that the apparatus be susceptible of being readily serviced without seriously interfering with the availability of the vehicle for its regular use.

As one of its objects, the present invention accordingly provides a prefabricated package unit form of air conditioning apparatus which can be produced more economically and compactly by factory operations and assembly and which can be readily installed in a utility space of a vehicle or removed therefrom when servicing or repairs to the unit become necessary.

Another object is to provide air conditioning apparatus of the compressor-condenser-evaporator refrigeration cycle type in which the main components, including the compressor, condenser, evaporator and an auxiliary air impelling means, are all contained in a housing and in which the housing includes a base plate to which the compressor and auxiliary air impelling means are secured for operation with maximum quietness and minimum vibration.

Still another object is to provide such a prefabricated package unit type of mechanical air conditioning apparatus of a size and shape to be capable of being readily installed in an existing vehicle in a utility space having the rear deck of the passenger compartment as one of its walls.

A further object is to provide vehicle air conditioning apparatus of the kind above referred to in which the unit has conditioning air delivery and intake means connected with the passenger compartment through openings of the rear deck, preferably end and intermediate openings of such deck.

It is, likewise, an object of this invention to provide such vehicle air conditioning apparatus in which the unit is isolated from adjacent vehicle structure by vibration-absorbing supports while being driven through flexible shaft means connected with a power source on the vehicle, and in which flexible conduit means connected with the unit conducts conditioning and auxiliary air relative thereto.

As another of its objects, this invention provides such vehicle air conditioning apparatus in which flexible conduit means of the conditioning air circuit engages the rear deck and defines a plenum chamber to which fresh air is admitted and filtered, the conditioning air being impelled through the conditioning air circuit by blower means located in the unit, preferably by a pair of blowers having their discharges in communication with the passenger compartment through the end openings of the rear deck.

Yet another object is to provide vehicle air conditioning apparatus in which outside air, for example auxiliary or condenser cooling air, being supplied to the unit is admitted through air intake means formed, at least in part, by a tail-light housing of the vehicle.

Additionally, this invention provides vehicle air conditioning apparatus of the character indicated above in which the conditioning air being supplied to the passenger compartment is delivered thereto through duct means extending upwardly to and forwardly along the roof of the vehicle, the duct means preferably being disposed along both sides of the compartment and made of a substantially transparent plastic material and having louvered and adjustable delivery outlets at spaced points therealong.

The invention can be further briefly summarized as consisting in certain novel combinations and arrangements of parts hereinafter described and particularly set out in the claims hereof.

In the accompanying sheets of drawings, forming a part of this specification:

Fig. 6 is mainly a top and rear perspective view showing the unit removed from the vehicle and with portions of the unit broken away;

Fig. 7 is a rear elevation of the unit in detached relation showing the same with portions broken away and with the blowers for the conditioning air removed therefrom;

Fig. 8 is a partial vertical section taken transversely of the unit as indicated by section line 8—8 of Fig. 7 and further illustrating the blower means for the auxiliary air to the condenser;

Fig. 9 is a partial vertical section taken through the roof and rear deck of the vehicle as indicated by section line 9—9 of Fig. 1 and showing the duct means for distributing the conditioning air in the passenger compartment;

Fig. 10 is another partial vertical section taken through a portion of the vehicle roof and through one of the ducts transversely of the latter, as indicated by section line 10—10 of Fig. 1;

Fig. 11 is a partial bottom plan view of one of the ducts at the location of one of the louvered outlets thereof;

Fig. 12 is a plan view with portions thereof broken away, showing a modified construction for this vehicle air conditioning apparatus and which is also in the form of a prefabricated package unit;

Figure 1:
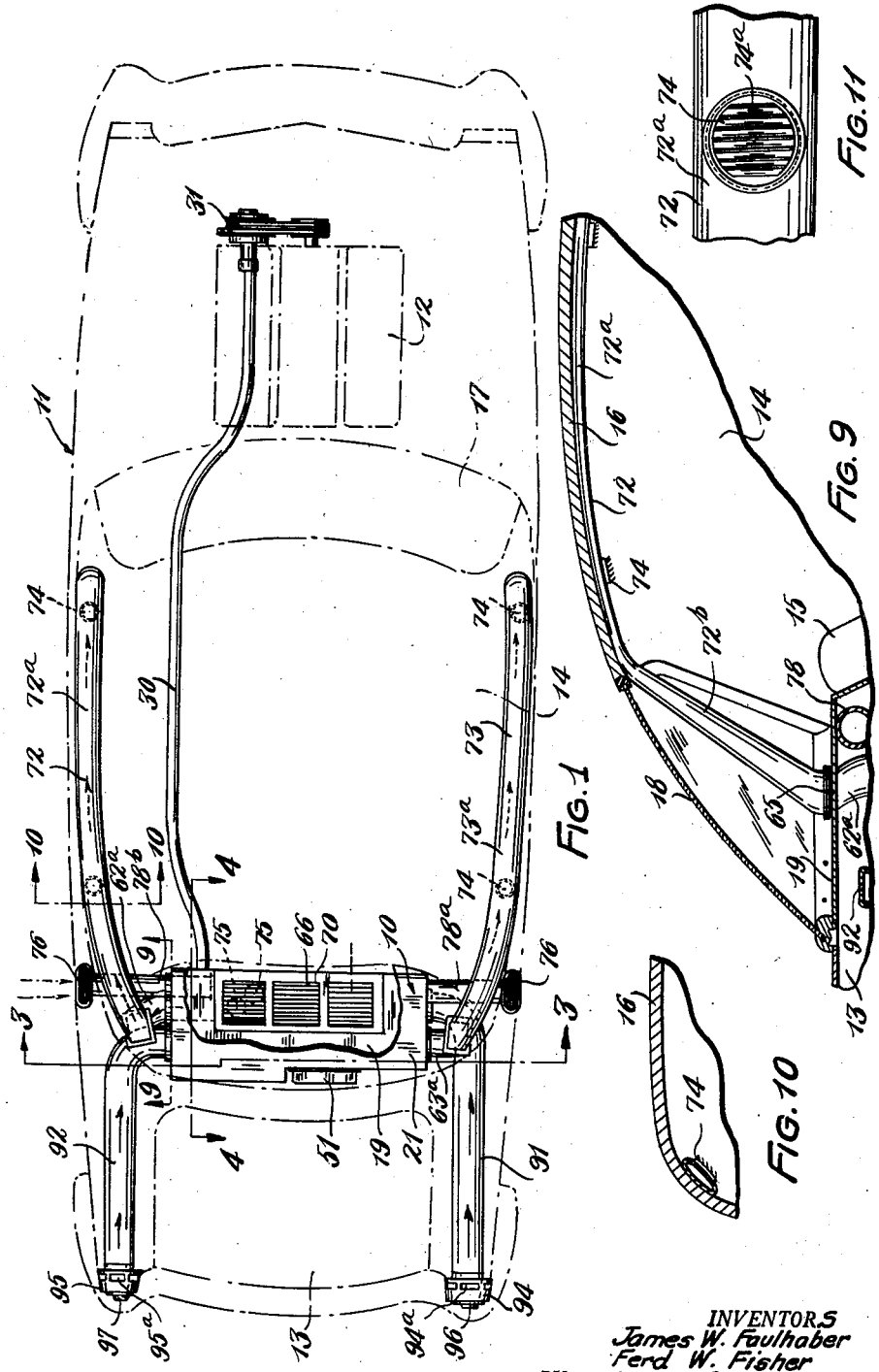
Fig. 1 is a plan view showing vehicle air conditioning apparatus of this invention in its installed relation in a motor vehicle.
Figure 3:
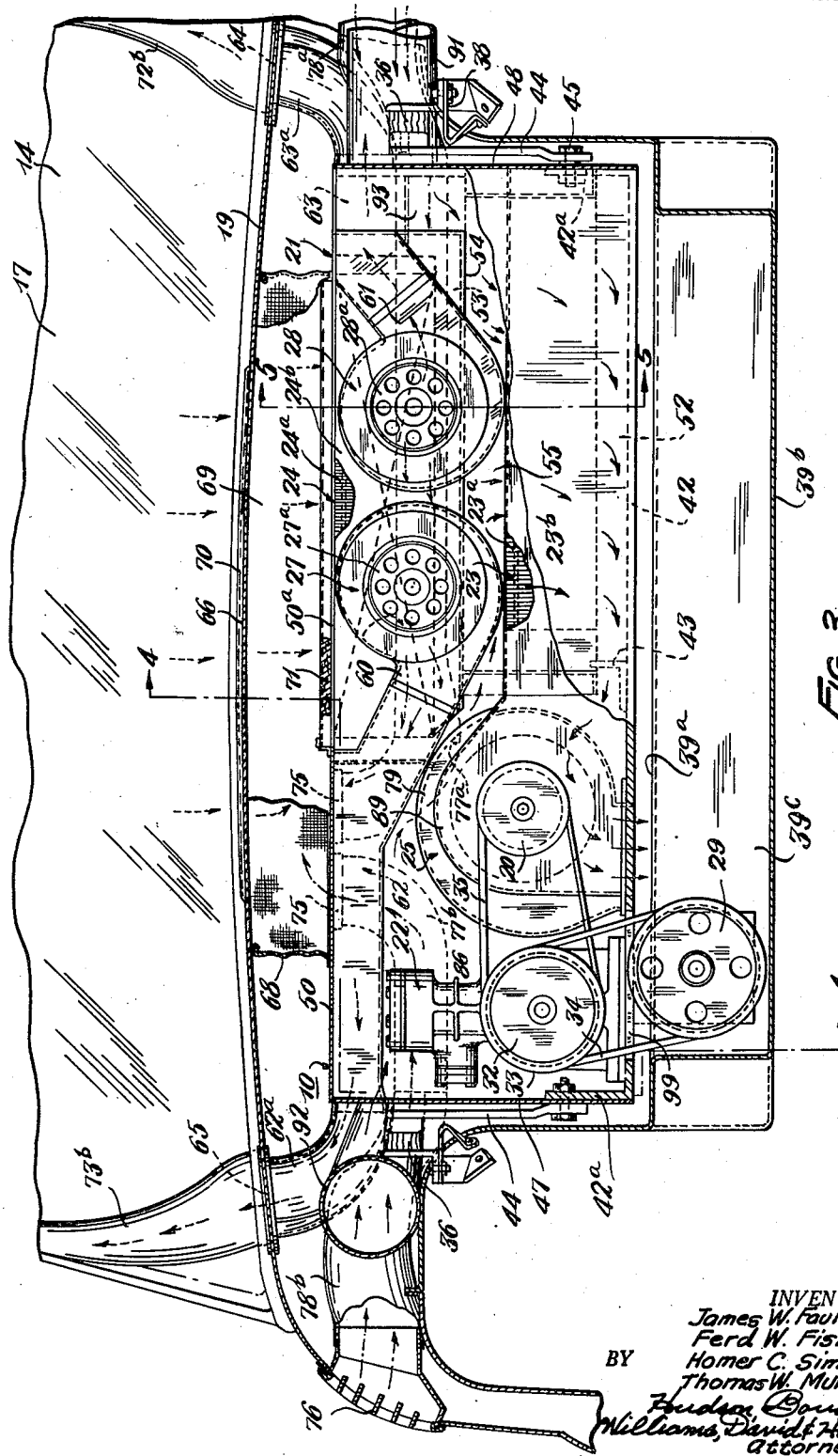
Fig. 3 is a vertical section taken through the unit transversely of the vehicle substantially as indicated by section line 3—3 of Fig. 1.

The air conditioning apparatus 10 in a prefabricated package unit form is shown in Figs. 1 and 3 in its installed position in a motor vehicle 11. Although the air conditioning apparatus 10 can be used in various types of vehicles, the vehicle 11 is here shown as being a passenger automobile having a driving motor 12 located in a forward engine compartment and also having a rear trunk or utility compartment 13 defining a utility or storage space. The vehicle 11 also has a passenger compartment 14 therein located between the forward engine compartment and the utility compartment 13 and which is equipped with passenger seats including a rear seat 15. The passenger compartment 15 is defined in part by a top 16, a windshield 17, a rear window 18 and a rear deck 19. This rear deck is laterally elongated transversely of the vehicle and is located adjacent the bottom of the rear window 18 and just rearwardly of the rear seat 15, such as to form a partition wall between the rear portion of the passenger compartment 14 and the front portion of the utility compartment 13.

The air conditioning unit 10 comprises in general a housing 21 having mechanical air conditioning apparatus therein including a compressor 22, a condenser 23, an evaporator 24 and an auxiliary air impelling means in the form of a blower 25 adapted to supply cooling air to the condenser. The compressor 22, the condenser 23 and the evaporator 24, together with a refrigerant supply tank 26, are suitably connected in a refrigerating cycle in a manner well known in the mechanical refrigeration art. The air conditioning unit 10 also comprises impelling means for the conditioning air and which impelling means is here shown as comprising a pair of blowers 27 and 28 having individual driving motors 27ª and 28ª.

The conditioning unit 10 also includes a driving means for the compressor 22 and the blower 25, and which is here shown as being a drive pulley 29 which is driven from the vehicle engine 12 through a flexible shaft 30 whose forward end is adapted to be connected with the vehicle motor through suitable clutch mechanism 31. The compressor 22 is equipped with pulleys 32 and 33 of which the latter is driven from the drive pulley 29 through the belt 34. The blower 25 is equipped with a pulley 20 which is driven from the compressor pulley 32 through the belt 35.

The air which is cooled by the evaporator means and is supplied to, or circulated through, the vehicle compartment 14 by the blowers 27 and 28 is conveniently referred to herein as conditioned or conditioning air, and the air which is supplied to the condenser means for cooling the same is conveniently referred to herein as auxiliary air.

As shown in the drawings, the air conditioning unit 10 is located in an available portion of the utility space of the compartment 13, such as in the forward portion of this compartment immediately behind the rear seat 15 and beneath the rear deck 19. In order to utilize this portion of the utility space to best advantage, the unit 10 is of a generally rectangular plan shape and elongated transversely of the vehicle. This shape for the conditioning unit 10 also enables the unit to be readily mounted on the vehicle by the use of the pairs of flexible vibration-absorbing mountings 36 and 37.

Figure 2:
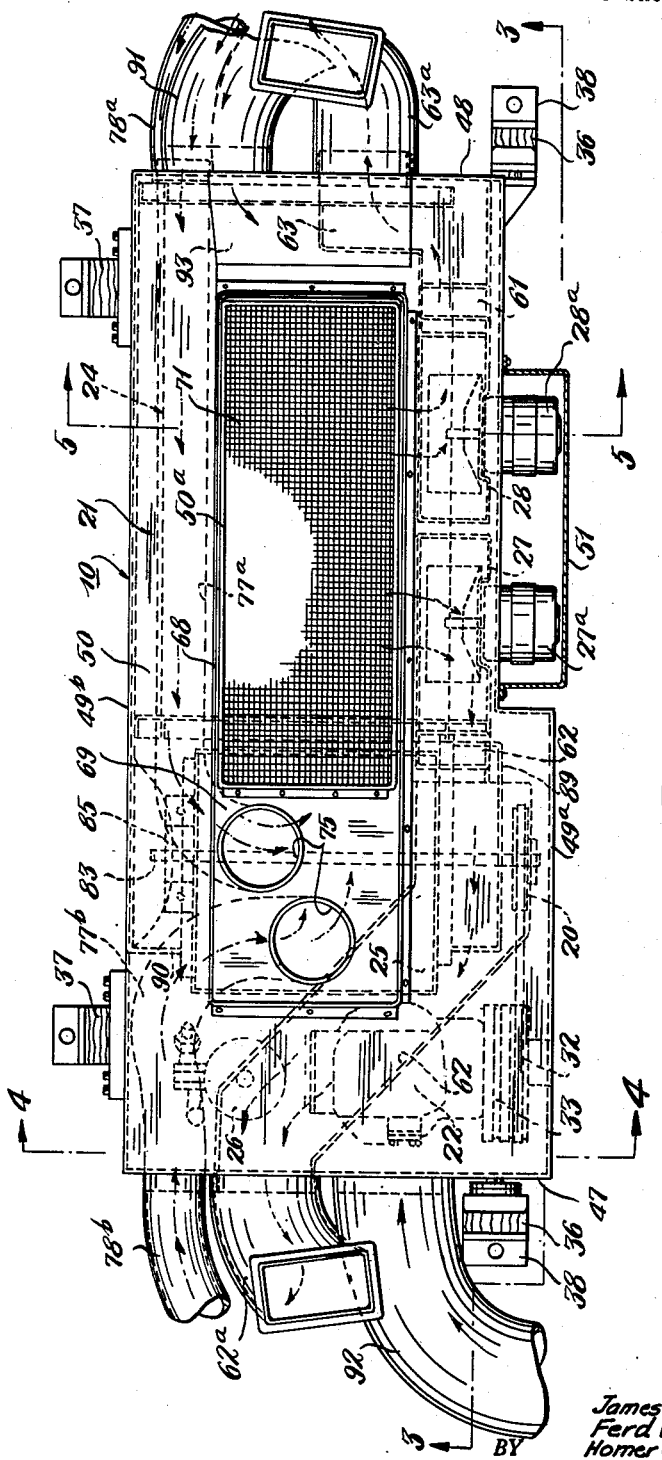
Fig. 2 is a plan view of the conditioning apparatus in the form of a prefabricated package unit.
Figure 4:
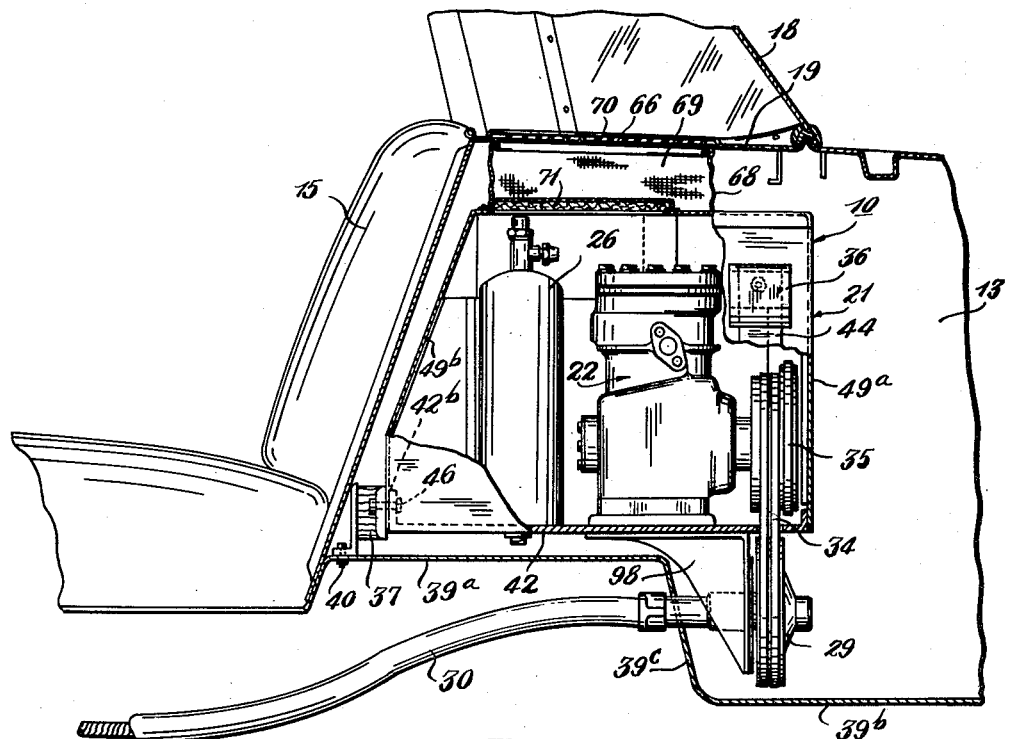
Fig. 4 is a vertical section taken through the unit longitudinally of the vehicle substantially as indicated by section line 4—4 of Figs. 1, 2 and 3.
Figure 5:
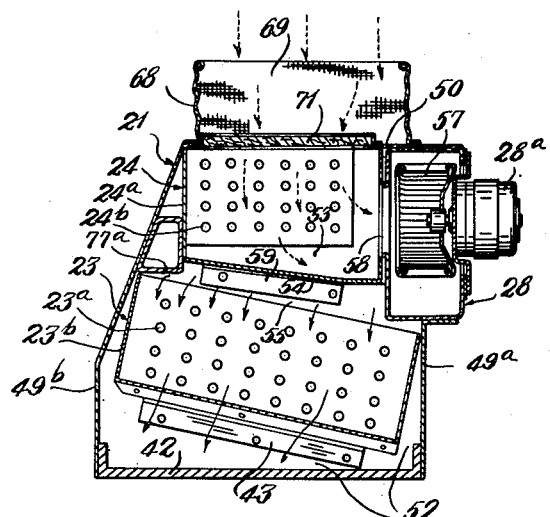
Fig. 5 is another vertical section taken through the unit substantially on section line 5—5 of Fig. 2.

By the use of the flexible mountings 36 and 37, the unit 10 can be supported in isolated relation to adjacent vehicle structure, such that the unit will be capable of limited relative shifting, but will not have jolting contact with such adjacent vehicle structure. As shown in Figs. 2, 3 and 4, the vibration-absorbing mountings 36 are located at the ends of the unit 10 at a relatively high point adjacent the rear edge of the unit and support such ends of the unit on suitable brackets 38 which are secured to adjacent vehicle structure. The flexible mountings 37 are located adjacent the lower front edge of the unit 10 at laterally spaced points thereof and are attached to available vehicle structure, such as the elevated floor portion 39ª of the utility compartment, by the fastening members 40. The mountings 36 and 37 are of a conventional type having an interposed yieldable body of rubber or the like in shear.

It is important that the conditioning unit 10 be compact so as to conserve the available space in the utility compartment 13 and also that it be of a rugged self-contained construction, such that it can be readily assembled into the utility space or removed therefrom as a prefabricated package unit. It is also very important that the compressor 22 and the blower 25 operate quietly and with a minimum amount of vibration. These requirements are all satisfactorily met in the present invention by providing the housing 21 with a rigid metal base plate 42 at the bottom thereof and which constitutes the floor portion of the frame of the unit. For increased stiffness and other reasons, the base plate 42 is provided with upturned end and side flanges 42ª and 42ᵇ. The compressor 22 and the blower 25 are bolted or otherwise securely fastened to this base plate. The condenser 23 is also mounted on the base plate 42, or on the base plate and housing jointly, as by means of suitable mounting brackets 43.

The weight load of the unit 10 is applied to the flexible mountings 36 and 37 by having these mountings connected with the base plate 42. This is accomplished by connecting the lower ends of flat hanger rods 44 depending from the flexible mountings 36 with the end flanges 42ª by the bolts 45. The flexible mountings 37 are connected with the side flanges 42ᵇ of the base plate as by means of bolts 46.

The housing 21 also comprises end walls 47 and 48, side walls 49ª and 49ᵇ and a top wall 50. These walls are made of suitable sheet metal and constitute a main cover structure which is connected with and supported by the base plate 42 or by suitable frame members connected with the latter. This main cover structure extends around and encloses all of the components of the air conditioning apparatus, with the exception of the driving motors 27ª and 28ª of the blowers 27 and 28. These motors project laterally from the rear side wall 49ª of the unit and are enclosed by an auxiliary cover 51. Suitable heat and sound insulating material (not shown), in sheet or slab form, can be applied to the walls of the housing 21, preferably as a lining on the inside thereof.

As shown in the drawings, the condenser 23 comprises a heat-exchange core 23ª disposed in a sheet metal shell 23ᵇ, such that when this condenser is mounted in the unit 10 by being supported in spaced relation above the base plate 42, it will accommodate a downward flow of auxiliary cooling air through the core thereof. This auxiliary air is represented by the arrows 41 and upon leaving the condenser core 23ª it flows into a laterally extending air passage 52 defined between the bottom of the condenser and the base plate 42.

The evaporator 24 comprises a heat-exchange core 24ª disposed in a sheet metal shell 24ᵇ. The core 24ª accommodates a downward flow of conditioning air therethrough into a space 53 defined between the bottom of this core and a transverse wall 54 formed by the bottom of the shell 24ᵇ of the evaporator. The evaporator 24 is supported in the housing 21 by having the shell 24ᵇ thereof suitably connected with and spaced above the condenser 23, as by means of brackets 59. The intervening space between the bottom wall 54 of the evaporator shell and the top of the condenser 23 defines a laterally extending air passage 55 through which the auxiliary air can flow into the top of the condenser core 23ª.

The blowers 27 and 28 each comprise a blower housing 56 and an impeller 57 rotatable in such housing and carried by the shaft of the driving motor. The driving motors 27ª and 28ª are mounted on the blower housings 56 and these blower housings, in turn, are connected with a side wall of the shell 24ᵇ of the evaporator 24. The blower housings 56 have conditioning air inlet openings 58 which communicate with the air space 53 of the evaporator 24 through openings in the rear side wall of the evaporator shell 24b. The blower housings 56 also have delivery outlets 60 and 61 facing toward opposite ends of the unit 10 and with which the conditioning air delivery ducts 62 and 63 are connected. The outer ends of the delivery ducts 62 and 63 are provided with fittings 62a and 63a having flanged ends engaging the underside of the rear deck 19.

The rear deck 19 is laterally elongated transversely of the vehicle, as mentioned above, and has a pair of end openings 64 and 65 therein which are located adjacent the ends of this deck and near opposite sides of the vehicle 11. The deck 19 also has a laterally elongated intermediate opening 66 therein which is located between the end openings 64 and 65 and in the center portion of the deck such as to extend across the longitudinal center line of the vehicle.

The end openings 64 and 65 of the deck 19 constitute conditioned air delivery openings through which the conditioned air is supplied by the unit 10 to the passenger compartment 14. The intermediate opening 66 constitutes a return opening through which the conditioned air is returned from the passenger compartment 14 to the unit 10. The ducts 62, 63 and the fittings 62a, 63a constitute a pair of branched outlets of the internal passage means carrying the conditioned air with the fittings engaging the deck 19 such that these branched outlets communicate with the passenger compartment through the end deck openings 64 and 65.

The evaporator 24 is located in the housing 21 at or adjacent the top wall 50 thereof and such top wall has an opening 50a therein overlying the evaporator core 24a. When the unit 10 is mounted in the utility compartment 13 of the vehicle, in the relation shown in the drawings, the top wall 50 of the housing 21 is located beneath and spaced from the rear deck 19. The top wall of the housing carries a so-called boot or flexible conduit 68 which has an inherent tendency to extend itself upward away from such top wall.

When the unit 10 is in its installed position in the vehicle, the upper end of the conduit 68 engages the underside of the deck 19 in encompassing relation to the intermediate opening 66 and defines a plenum chamber 69. The plenum chamber 69 is in communication with the passenger compartment 14 through a grille 70 attached to the deck 19 in overlying relation to the intermediate opening 66, and is also in communication with the air passages of the evaporator core 24a through the top wall opening 50a of the housing 21. An air filter 71 is provided in the plenum chamber 69 and is suitably secured to the top wall of the housing 21 so as to extend across the inlet to the evaporator 24.

The air for conditioning the passenger compartment 14 is drawn through the core 24a of the evaporator 24 by the blowers 27 and 28 and is delivered by the latter to the passenger compartment through the duct means 62, 63 leading to the end openings 64 and 65 of the deck 19. The conditioned air is returned to the unit 10 from the passenger compartment 14 through the intermediate opening 66 of the deck 19 and is drawn through this opening and through the plenum chamber 69 and the filter 71 by the action of the blowers 27 and 28.

The conditioned air being supplied to the passenger compartment 14 by the blowers 27 and 28 can be delivered directly into the passenger compartment through the deck openings 64 and 65, but the present invention contemplates the use of distributing duct members 72 and 73 for distributing the conditioned air in the passenger compartment in a manner to insure a more equal distribution of the air between different portions of the compartment, and in a manner to avoid the occurrence of uncomfortable direct drafts against the passengers. The duct members 72 and 73 are here shown as comprising longitudinally extending duct portions 72a and 73a extending along the roof 16 in a generally forward direction at opposite sides of the vehicle, and upwardly and forwardly extending connecting duct portions 72b and 73b extending between and connecting the longitudinal duct portions 72a and 73a with the delivery fittings 62a and 63a.

The distributing duct members 72 and 73 are made of a substantially transparent plastic material so as to be relatively inconspicuous, and the longitudinal duct portions 72a and 73a thereof lie relatively close to and follow the general curvature of the roof 16 so as to occupy a minimum amount of space in the vehicle compartment. The longitudinal duct portions 72a and 73a are provided at spaced points therealong with louvered outlet fittings 74 forming overhead outlets located above the ends of the front and rear seats and through which the conditioned air is directed generally downwardly into the passenger compartment 14.

The louvered outlet fittings 74 have the louvers 74a thereof extending in parallel relation thereacross and are rotatably movable for shifting the position of the group of louvers, such that the individual passengers can readily adjust their outlet fittings to direct the incoming stream of conditioned air in any one of a number of different directions radiating from such outlet fitting. By thus adjusting the louvered outlet fittings individually, the incoming stream of conditioned air can be directed against or away from a passenger in accordance with his own wishes and comfort requirements.

The conditioned air which is supplied to the passenger compartment 14, as explained above, consists largely of recirculated air, but also comprises fresh air which is taken in from outside the vehicle through louvered ornamental fittings 76 located in one or both external side wall of the vehicle, such that the fresh air admitted therethrough will be relatively free of dust and exhaust fumes. The fresh air is supplied to the plenum chamber 69 at a point above the filter 71 through intake ducts 77a and 77b located in the housing 21 and having their inner ends in communication with the plenum chamber through openings 75 of the top wall 50 of the housing. The outer ends of the ducts 77a and 77b are connected with the intake fittings 76 as by flexible conduit portions 78a and 78b.

The fresh air which is drawn through the intake ducts 77a and 77b by the blowers 27 and 28 becomes mixed with the recirculated air in the plenum chamber 69, after which it passes through the filter 71 for the removal of any dust, or the like, which may be entrained therein. The amount of fresh air which is admitted can be varied by suitable dampers (not shown) provided in the intake ducts 77a and 77b, or by making the louvers of the intake fittings 76 movable and moving the same to a closed or partially opened position.

Instead of using conditioned air which comprises a mixture of fresh air and recirculated air, the same conditioning unit 10 can be used to supply conditioned air which consists only of fresh air taken in from outside the vehicle through the intake fittings 76. This is accomplished by closing or covering the grille 70 of the rear deck 19, or by omitting this grille entirely and leaving the rear deck imperforate. When this is done, the fresh air is drawn in through the fittings 76 and the plenum chamber 69 by the blowers 27 and 28 which then deliver the conditioned fresh air into the vehicle compartment through the distributing ducts 72 and 73. The conditioned air escapes from the vehicle compartment by exfiltration through door and window crevices and the like.

The auxiliary air for cooling the condenser 23 is drawn downwardly through the core 23a of the latter by the blower 25. This blower comprises an elongated blower housing 79 having end inlet openings 80 and 81 at opposite ends thereof, and a blower wheel 82 supported for rotation in such housing by a shaft 83 and a pair of bearings 84 and 85 in which such shaft is journaled. The blower pulley 20 is mounted on one end of the shaft 83.

The blower 25 and the compressor 22 are located in a space 86 provided in the housing 21 between the end wall 47 and the adjacent ends of the condenser and evaporator units 23 and 24. The blower 25 is mounted on the base plate 42 by having the discharge portion 87 of its housing 79 connected with such base plate so as to communicate with an outlet opening 88 in the latter. The auxiliary air which has been drawn through the condenser core 23 by the blower 25 is discharged by the latter to the outside atmosphere through the opening 88. This auxiliary air is conducted to the end openings 80 and 81 of the blower housing 79 by shroud members 89 and 90 which communicate with the air passage 52 formed beneath the condenser core. The shaft 83 extends through the shroud member 89, such that the blower pulley 20 is located outside of this shroud member.

The auxiliary air for cooling the condenser 23 is outside air which is drawn in by the action of the blower 25 and is admitted to the unit 10 through the end walls 47 and 48 of the housing 21 to which such air is conducted by a pair of flexible conduits 91 and 92. The portion of this condenser cooling air which is supplied by the conduit 91, moves downwardly through an irregular passage 93 into the space 55 from which it is drawn downwardly through the core 23ᵃ of the condenser 23 by the blower 25. The passage 93 is formed mainly by the space between the housing wall 48 and the adjacent end of the evaporator shell 24ᵇ. The condenser cooling air which is supplied to the housing 21 by the conduit 92 enters the space 86 of the housing and flows thereacross into the space 55, from which it is likewise drawn through the condenser core 23ᵃ by the blower 25. In moving through or across the space 86, the auxiliary air supplied by the conduit 92 assists in cooling the compressor 22.

The auxiliary air intake conduits 91 and 92 extend rearwardly from the unit 10 through the utility compartment 13 at points along opposite sides of this compartment as shown in Fig. 1. The outer ends of the conduits 91 and 92 are connected with intake fittings 94 and 95 mounted on the rear end of the vehicle 11. These fittings have intake openings 94ᵃ and 95ᵃ therein and are formed, at least in part, by the housings of the tail lights 96 and 97.

The drive pulley 29 is located below the base plate 42 and is rotatably supported by a suitable bracket 98 mounted on the underside of this plate. The belt 34 which connects the compressor pulley 32 with the drive pulley 29 extends through an opening 99 of the base plate. When the unit 10 is in its assembled position in the utility compartment 13 of the vehicle, the drive pulley 29 is accommodated by the downwardly offset shape of the main floor portion 39ᵇ of the utility compartment with the flexible shaft 30 extending through an opening of the connecting floor portion 39ᶜ.

From the accompanying drawings and the foregoing detailed description, it will now be readily understood that this invention provides vehicle air conditioning apparatus in a prefabricated package form which is very rugged and compact and which can be readily assembled in a flexibly supported position in a portion of the utility compartment of a motor vehicle. It will now also be seen that the conditioning unit 10 will be very quiet in operation with a minimum amount of vibration by reason of the provision of a rigid base plate at the bottom of the housing and to which the compressor and the blower which supplies auxiliary cooling air to the condenser are secured. Moreover, it will be seen that by locating the conditioning unit in the utility compartment at a point beneath the rear deck, the conditioned air can be readily circulated through the passenger compartment and that by the use of distributing ducts in such passenger compartment a proper distribution of the air therein can be obtained without producing objectionable drafts on the passengers. It will, likewise, be seen that the mounting of the conditioning unit in the vehicle, as herein disclosed, provides a plenum chamber in the conditioned air circuit and to which plenum chamber fresh air can be admitted for mixing with the recirculated air and for filtering prior to its entering the passenger compartment. Additionally, it will be seen that the self-contained package unit 10 is readily removable from the vehicle for servicing and repairs, or for substitution of another such unit in its place, so as to avoid the necessity of withdrawing the vehicle from its regular service for any extended period of time.

Figure 13:
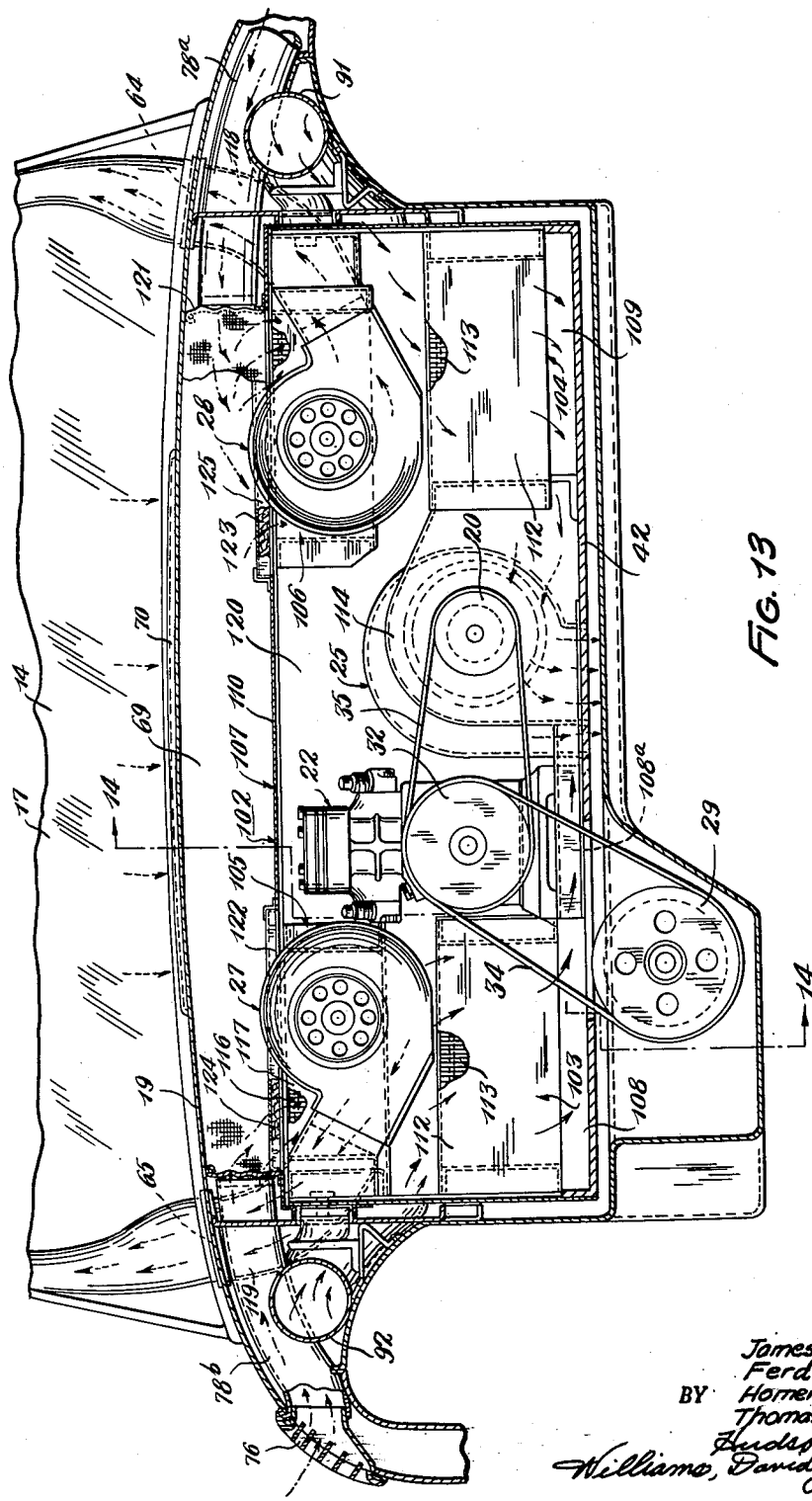
Fig. 13 is a vertical section taken through the modified unit in a direction transversely of the vehicle and as indicated by section line 13—13 of Fig. 12.
Figure 14:
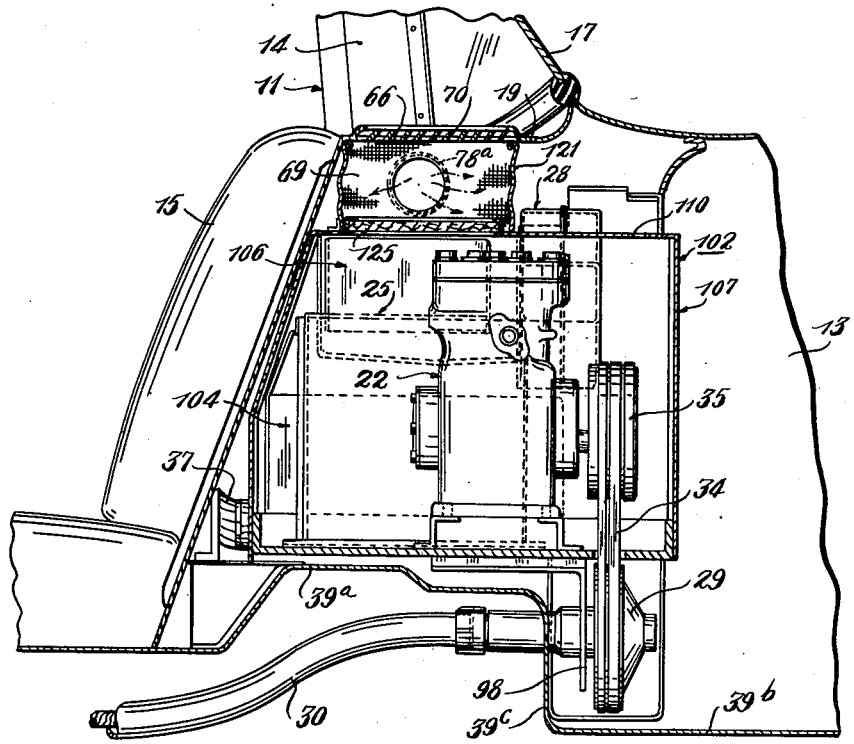
Fig. 14 is another vertical section taken through the modified unit in a direction longitudinally of the vehicle and as indicated by section line 14—14 of Fig. 13.

Figs. 12, 13 and 14 of the drawings show a modified construction for this vehicle air conditioning apparatus and which is also in the form of a prefabricated package unit 102. Since the modified unit 102 is generally similar to the unit 10 and is intended for installation in the same location in the vehicle 11, the same reference characters have been used in connection with the modified unit to designate the same corresponding parts.

In the modified unit 102, however, a different construction and arrangement is provided for the condenser means and evaporator means of the refrigerating cycle, such that a more balanced arrangement for the various components is obtained and a more satisfactory and efficient use is made of the available space in the housing of the unit. This is accomplished by constructing the condenser means in the form of two condenser sections 103 and 104, and by also constructing the evaporator means in the form of two evaporator sections 105 and 106.

The condenser sections 103 and 104 are located in the housing 107 adjacent the ends thereof and are suitably supported in spaced relation above the base plate 42 to provide air spaces or passages 108 and 109 beneath these condenser sections. The evaporator sections 105 and 106 are suitably supported in the housing 107 adjacent the ends thereof and at points above the respective condenser sections 103 and 104 and immediately beneath the top wall 110 of the housing. In this modified construction, the conditioning air blowers 27 and 28 are also located adjacent the ends of the housing 107, such that their discharges will be closer to the delivery openings 64 and 65 of the vehicle deck 19 for a more direct connection with the passenger compartment 14 through the latter openings.

The condenser sections 103 and 104 are of a construction generally similar to the condenser 23 of the unit 10 described above, in that they each comprise a shell 112 and a core 113 in such shell. Auxiliary air admitted to the housing 107 through the conduits 91 and 92 is drawn through the condenser sections 103 and 104 by the auxiliary air blower 25. In passing to the blower 25, the auxiliary air leaves the condenser section 103 by flowing laterally through the passage 108 and through a portion 108ᵃ of this passage which extends beneath the compressor 22. The auxiliary air leaving the condenser section 104 flows to the blower 25 through the passage 109 and through a hood 114 with which the passages 108 and 109 are connected.

The evaporator sections 105 and 106 each comprise a core 116 located in a shell 117, such that air can be drawn through the cores 116 of these evaporator sections by the respective blowers 27 and 28. The discharge nozzles of the housings of the blowers 27 and 28 are connected with the delivery openings 64 and 65 of the rear deck 19 by suitable flexible conduits or fittings 118 and 119 which project from the housing 107 adjacent the ends thereof. The housing openings which accommodate the fittings 118 and 119 are formed in part in the top wall 110 and in part in the end walls of the housing.

The auxiliary air blower 25 and the compressor 22 are located in a generally central position in the housing 107 so as to be accommodated in the relatively clear space 120 available therein between the pair of condenser sections 103 and 104. The compressor 22 and blower 25 are driven by the same general belt and pulley arrangement as has been described above for the unit 10.

The modified unit 102 also differs from the unit 10 in that the flexible conduit or boot 121 of the modified unit extends along the housing 107 for a greater portion of the length of its top wall 110, so as to encompass the laterally spaced air inlet openings 122 and 123 through which the conditioned air returning from the passenger compartment 14 flows downwardly from the plenum chamber 69 into the cores of the evaporator sections 105 and 106. These inlet openings 122 and 123 for the evaporator sections 105 and 106 are provided with suitable filters 124 and 125 located in the plenum chamber 69 and supported by the top wall 110 of the housing.

The fresh air which is admitted from the outside of the vehicle through the fresh air intakes 76 and the conduits 78ª and 78ᵇ enters the plenum chamber 69 at a point above the filters 124 and 125, as shown in Fig. 13, such that some of this outside air will be mixed with the return air in the plenum chamber and will be supplied to the passenger compartment 14 as a part of the conditioned air being circulated through the latter by the blowers 27 and 28. If desired, the conditioned air can consist entirely of fresh air, as explained above for the unit 10, and this can be accomplished by closing or omitting the grille 70.

From the accompanying illustration in Figs. 12, 13 and 14 and the foregoing detailed description applying thereto, it will now be readily understood that this modified prefabricated package form of air conditioning unit represents a very compact construction having the same general advantages as have already been described above for the conditioning unit 10 and which, in addition, has the advantage that the paired arrangement for the condenser sections and the evaporator sections results in a more balanced arrangement for the components and a more satisfactory and efficient use of the available space. It will now also be seen that the paired arrangement for the evaporator sections provides a more satisfactory location for the conditioned air blowers, such that they can be more readily and directly connected with the conditioned air delivery openings communicating with the passenger compartment.

Instead of using conditioned air which comprises a mixture of fresh air and recirculated air, the same conditioning unit 10 can be used to supply conditioned air which consists only of fresh air taken in from outside the vehicle through the intake fittings 76. This is accomplished by closing or covering the grille 70 of the rear deck 19, or by omitting this grille entirely and leaving the rear deck imperforate. When this is done, the fresh air is drawn in through the fittings 76 and the plenum chamber 69 by the blowers 27 and 28 which then deliver the conditioned fresh air into the vehicle compartment through the distributing ducts 72 and 73. The conditioned air escapes from the vehicle compartment by exfiltration through door and window crevices and the like.

Although the vehicle air conditioning apparatus of this invention has been illustrated and described herein to a somewhat detailed extent, it will be understood, of course, that the invention is not to be regarded as being limited correspondingly in scope, but includes all changes and modifications coming within the terms of the claims hereof.

Having thus described our invention, we claim:

1. Vehicle air conditioning apparatus in the form of a prefabricated package unit for installation in a utility space of a motor vehicle; comprising a housing including a frame and a substantially rigid metal base plate secured to said frame; a refrigerant compressor, a condenser means and an evaporator means in said housing and connected in a refrigerating cycle relationship; said housing having a first inlet means and outlet means for conditioning air and having a second inlet means and outlet means for auxiliary air; walls in said housing defining a first air passage means connecting said first inlet and outlet means and extending in heat-exchange relation to said evaporator means, and a second air passage means connecting said second inlet and outlet means and extending in heat-exchange relation to said condenser means; blower means in said housing and effective to produce a flow of said conditioning air through said first passage means; other blower means in said housing and effective to produce a flow of said auxiliary air through said second air passage means; pulleys on said compressor and said other blower means; a pulley bracket; a drive pulley supported by said pulley bracket; belt means connecting said pulleys with said drive pulley; means mounting said compressor, said other blower means and said pulley bracket in fixed relation on said base plate; and a flexible drive shaft having one end thereof connected with said drive pulley and its other end adapted for connection with the driving motor of the vehicle.

2. In a vehicle having a compartment to be air conditioned and a utility space located beneath a deck extending transversely of the vehicle and forming a wall of said compartment; an air conditioning apparatus in the form of a prefabricated package unit located in said space and comprising a housing spaced from said deck and having therein a cooling means and means for causing a flow of conditioning air in heat-exchange relation to said cooling means; said deck having a laterally elongated opening therein for passage therethrough of said conditioning air and said housing having a laterally elongated top opening located beneath the opening of said deck; flexible mounting devices mounting said unit on said vehicle for limited movement relative thereto; and flexible conduit means having a generally rectangular and laterally elongated cross-sectional shape and extending between said housing and deck and forming a passage connecting said top opening with the opening of said deck; said flexible conduit means being mounted on and supported by said housing and embodying expansion means tending to extend said conduit means upwardly for pressing the upper end of said conduit means against the underside of said deck.

3. In a vehicle having a compartment to be air conditioned and a utility space located beneath a deck extending transversely of the vehicle and forming a wall of said compartment; an air conditioning apparatus in the form of a prefabricated package unit located in said space and comprising a housing disposed beneath and spaced from said deck and having therein a cooling means; said deck having a laterally elongated opening therein and said housing having a laterally elongated top opening located beneath the deck opening; vibration absorbing flexible mounting devices mounting said unit on said vehicle; flexible conduit means having a generally rectangular and laterally elongated cross-sectional shape and extending between said housing and said deck in encompassing relation to said top opening and said deck opening and defining a plenum chamber between said housing and deck; said flexible conduit means being mounted on and supported by said housing and embodying expansion means tending to extend said conduit means upwardly for pressing the upper end of said conduit means against the underside of said deck; air impelling means in said unit operable to cause recirculation of conditioning air through said compartment by causing a flow of such conditioning air through said plenum chamber into said housing and in heat-exchange relation to said cooling means; a filter element extending across substantially the entire area of said top opening and lying adjacent the bottom of said plenum chamber; and fresh air supply means communicating with said plenum chamber above said filter element.

4. In a vehicle having a main driving motor and also having a compartment to be air conditioned and a utility space located beneath a deck forming a wall of said compartment and extending transversely of the vehicle; an air conditioning apparatus in the form of a prefabricated package unit located in said space and comprising a housing including a frame and a substantially rigid metal base plate secured to said frame and forming at least a portion of the floor of said housing; said deck having end deck openings therein adjacent its ends and an intermediate deck opening between said end deck openings; a refrigerant compressor in said housing; condenser means and evaporator means in said housing and connected in a refrigerating cycle with said compressor; a blower in said housing and operable to cause a flow of auxiliary air in heat-exchange relation to said condenser means; said compressor and blower having pulleys thereon and being secured to said base plate; a driving pulley; bracket means supporting said driving pulley and secured to said base plate; belt means connecting said pulleys with said driving pulley; vibration absorbing flexible mounting devices connected with said frame and mounting said unit on the vehicle; flexible drive shaft means connecting said driving pulley with said main driving motor; said housing having a pair of end housing openings and an intermediate housing opening between said end housing openings; means in said housing defining a conditioning air passage means therein for conducting conditioning air in heat-exchange relation to said evaporator means and said conditioning air passage means having one end thereof connected with said intermediate housing opening and at its other end having branch passage portions connected with said end housing openings; flexible conduit means extending between said housing and deck including flexible conduit means connecting said intermediate housing opening with said intermediate deck opening and other flexible conduit members connecting said end housing openings with the respective end deck openings; and blower means operable in said conditioning air passage means for moving conditioning air therethrough to and from said compartment.

5. In combination with a vehicle having wall means defining a utility space and a passenger compartment, including a laterally elongated deck extending between said utility space and passenger compartment; said deck having a pair of end openings adjacent the ends thereof and an intermediate opening between said end openings; an air conditioning apparatus of the compressor-evaporator type and in the form of a laterally elongated prefabricated package unit located in said utility space beneath said deck; the evaporator means of said unit comprising a pair of evaporator sections located in said unit adjacent the ends thereof; conduit means connecting said unit in a conditioning air circuit with said passenger compartment through said end and intermediate openings of said deck; a pair of blowers associated with said evaporator sections and operable to cause the conditioning air to flow through said circuit and in heat-exchange relation to said evaporator sections; said blowers being also located in said unit adjacent the ends thereof and being effective to cause return air to move from said passenger compartment to said evaporator sections through said intermediate deck opening and to cause conditioned air to be delivered from said evaporator sections to said passenger compartment through said end openings of said deck; the conduit means extending between said unit and said deck defining a plenum chamber therebetween through which said return air flows to said evaporator sections; and outside air inlet means connected with said plenum chamber for supplying fresh air thereto.

6. In combination with a vehicle having external side walls provided with air inlet openings and also having a utility compartment and a second compartment to be air conditioned, an air conditioning unit in said utility compartment comprising a housing having end portions spaced from said side walls, means at the top of said housing defining a plenum chamber having downwardly facing end openings adjacent the ends thereof and an air entry opening at the top thereof intermediate said end openings for the return of conditioning air from said second compartment, evaporator means in said housing, condenser means in said housing, said condenser means comprising a pair of condenser sections adjacent the ends of said housing and said evaporator means comprising a pair of evaporator sections adjacent the ends of said housing, said evaporator sections being above said condenser sections and disposed to receive conditioning air directly from said plenum chamber through said end openings, compressor means connected in a refrigerating cycle relation between said evaporator means and said condenser means, inlet means in said end portions for admitting fresh conditioning air to said plenum chamber and including conduit means connected with certain of said inlet openings, intake means in said end portions for admitting auxiliary air to said condenser means and including conduit means connected with others of said inlet openings, outlet means in said end portions for discharging said conditioning air from said evaporator means and including conduit means communicating with said second compartment at points adjacent the sides of the vehicle, a first blower means in said housing and operable to cause said auxiliary air to flow into said housing from said other inlet openings and in heat-exchange relation to said condenser means, and other blower means comprising a pair of blowers in said housing adjacent the ends thereof and associated with the respective evaporator sections and operable to cause said conditioning air to flow into said housing from said certain inlet openings and in heat-exchange relation to said evaporator means and to then be delivered to said second compartment through said outlet means, said first blower means and said compressor means being located in said housing at a point between said condenser sections.

References Cited in the file of this patent

UNITED STATES PATENTS

| | | |
|---|---|---|
| 938,181 | Thomas | Oct. 26, 1909 |
| 1,322,847 | Vickery | Nov. 25, 1919 |
| 1,934,998 | Stahlknecht | Nov. 14, 1933 |
| 2,053,206 | Sargent | Sept. 1, 1936 |
| 2,169,664 | Shifflett | Aug. 15, 1939 |
| 2,187,982 | Moncrief | Jan. 23, 1940 |
| 2,294,036 | Kettering | Aug. 25, 1942 |
| 2,480,510 | Roper | Aug. 20, 1949 |
| 2,667,765 | Harris et al. | Feb. 2, 1954 |
| 2,714,808 | Owen et al. | Aug. 9, 1955 |